United States Patent
Bonovich et al.

(10) Patent No.: US 10,368,126 B2
(45) Date of Patent: Jul. 30, 2019

(54) METHOD AND SYSTEM FOR DISPLAYING CONTENT OR CONFLICTS FROM MULTIPLE RECEIVING DEVICES ON A SECOND SCREEN DEVICE

(75) Inventors: Earl J. Bonovich, Tinley Park, IL (US); Charles W. Beeson, La Mirada, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/492,517

(22) Filed: Jun. 8, 2012

(65) Prior Publication Data

US 2013/0330063 A1    Dec. 12, 2013

(51) Int. Cl.
| | | |
|---|---|---|
| H04N 21/436 | (2011.01) | |
| H04N 21/472 | (2011.01) | |
| H04N 21/422 | (2011.01) | |
| H04N 21/431 | (2011.01) | |
| H04N 21/458 | (2011.01) | |

(52) U.S. Cl.
CPC ... *H04N 21/43622* (2013.01); *H04N 21/4222* (2013.01); *H04N 21/42209* (2013.01); *H04N 21/42224* (2013.01); *H04N 21/4312* (2013.01); *H04N 21/4583* (2013.01); *H04N 21/47214* (2013.01); *H04N 21/43615* (2013.01)

(58) Field of Classification Search
USPC .................................................. 386/291–299
See application file for complete search history.

(56) References Cited

U.S. PATENT DOCUMENTS

| | | | |
|---|---|---|---|
| 7,076,152 B1 * | 7/2006 | Eguchi et al. | 386/291 |
| 7,251,255 B1 | 7/2007 | Young | |
| 7,380,264 B2 | 5/2008 | Potrebic | |
| | (Continued) | | |

FOREIGN PATENT DOCUMENTS

| | | |
|---|---|---|
| EP | 1187467 A2 | 3/2002 |
| EP | 1355496 A2 | 10/2003 |
| | (Continued) | |

OTHER PUBLICATIONS

McGlaun, Shane; "Xfinity iOS app gets DVR manager"; Apr. 12, 2012; http://www.slashgear.com/xfinity-ios-app-gets-dvr-manager-12222591/; retrieved on Apr. 18, 2012, 7 pages.

(Continued)

*Primary Examiner* — Hung Q Dang
(74) *Attorney, Agent, or Firm* — Harness, Dickey & Pierce, P.L.C.

(57) ABSTRACT

A system and method is set forth for displaying schedule recording events on a second screen device that includes a controller and a display. The controller includes a hypertext transfer protocol (HTTP) engine and a calendar display module. The HTTP engine receives scheduled recording data from a first receiving device. The scheduled recording data comprising a plurality of scheduled recording events. The HTTP engine receives conflict data corresponding to a conflict between at least two scheduled recording events based on the scheduled recording data. The calendar display module displays the scheduled recording events on a calendar screen display and displays a screen indicator at the second screen device indicative of a conflict.

22 Claims, 11 Drawing Sheets

(56) References Cited

U.S. PATENT DOCUMENTS

| | | | |
|---|---|---|---|
| 7,689,995 B1 | 3/2010 | Francis et al. | |
| 7,773,859 B1* | 8/2010 | Potrebic et al. | 386/291 |
| 7,822,428 B1* | 10/2010 | Morris et al. | 455/508 |
| 7,917,008 B1 | 3/2011 | Lee et al. | |
| 8,116,611 B2 | 2/2012 | Bumgardner et al. | |
| 2002/0049620 A1* | 4/2002 | Uchida et al. | 705/5 |
| 2003/0072559 A1 | 4/2003 | Van Haver | |
| 2003/0086023 A1 | 5/2003 | Chung et al. | |
| 2004/0218905 A1 | 11/2004 | Green et al. | |
| 2005/0005300 A1 | 1/2005 | Putterman et al. | |
| 2005/0222971 A1* | 10/2005 | Cary | 707/1 |
| 2005/0235323 A1 | 10/2005 | Ellis et al. | |
| 2005/0251750 A1 | 11/2005 | Vallone et al. | |
| 2005/0273819 A1* | 12/2005 | Knudson et al. | 725/58 |
| 2006/0037047 A1 | 2/2006 | DeYonker et al. | |
| 2006/0037048 A1 | 2/2006 | DeYonker et al. | |
| 2006/0195873 A1 | 8/2006 | Gopalan et al. | |
| 2007/0226344 A1 | 9/2007 | Sparrell et al. | |
| 2008/0034391 A1 | 2/2008 | Lehman | |
| 2008/0063381 A1 | 3/2008 | Conroy et al. | |
| 2008/0066106 A1 | 3/2008 | Ellis et al. | |
| 2008/0166103 A1 | 7/2008 | Tajime | |
| 2008/0276284 A1 | 11/2008 | Bumgardner et al. | |
| 2009/0007184 A1* | 1/2009 | Nakamura et al. | 725/58 |
| 2009/0037953 A1 | 2/2009 | Roth | |
| 2009/0119715 A1 | 5/2009 | Schwesinger et al. | |
| 2009/0222875 A1 | 9/2009 | Cheng et al. | |
| 2009/0263101 A1* | 10/2009 | Rudolph et al. | 386/92 |
| 2010/0014831 A1* | 1/2010 | Nakano | 386/83 |
| 2010/0158476 A1* | 6/2010 | Hao et al. | 386/83 |
| 2010/0169829 A1* | 7/2010 | Stallings et al. | 715/810 |
| 2010/0202754 A1* | 8/2010 | Bhogal et al. | 386/83 |
| 2010/0319038 A1 | 12/2010 | Devassykutty et al. | |
| 2010/0333137 A1 | 12/2010 | Hamano et al. | |
| 2011/0243535 A1* | 10/2011 | Roberts et al. | 386/291 |
| 2013/0055314 A1* | 2/2013 | Martch | 725/58 |
| 2013/0170819 A1* | 7/2013 | Dykeman | H04N 21/41407 386/299 |

FOREIGN PATENT DOCUMENTS

| | | |
|---|---|---|
| EP | 2461599 A1 | 6/2012 |
| WO | 03/043320 A2 | 5/2003 |
| WO | 2005/107367 A2 | 11/2005 |
| WO | 2007/149414 A2 | 12/2007 |
| WO | 2008/077149 A2 | 6/2008 |

OTHER PUBLICATIONS

International Search Report and Written Opinion dated Aug. 12, 2013 in International Application No. PCT/US2013/044172 filed Jun. 4, 2013 by Earl J. Bonovich et al.

Chilean Office action dated Nov. 24, 2014 in Chilean Patent Application No. 1704-2012 filed Dec. 21, 2010 by Raynold M. Kahn et al.

Chinese Office action dated Jan. 4, 2015 in Chinese Patent Application No. 201080059920.0 filed Dec. 21, 2010 by Raynold M. Kahn.

* cited by examiner

METHOD AND SYSTEM FOR DISPLAYING CONTENT OR CONFLICTS FROM MULTIPLE RECEIVING DEVICES ON A SECOND SCREEN DEVICE

TECHNICAL FIELD

The present disclosure relates generally a television programming delivery system, and, more specifically, to using a second screen device to simultaneously control multiple set top boxes.

BACKGROUND

The statements in this section merely provide background information related to the present disclosure and may not constitute prior art.

Television content providers provide content to multiple types of users including mobile users, fixed residential users and commercial users. Residential users may have multiple set top boxes.

Mobile devices such as touch-screen mobile devices have also increased in popularity. Such devices are typically connectable to the internet to obtain content from various sources. Mobile touch-screen devices include the iPad® by Apple and various Android® operating system devices.

Many service providers also provide customers with a way for scheduling a recording of content at a set top box. DIRECTV® provides a website, mobile phone access and iPad® access to schedule a recording while away from the set top box.

Many users have multiple receiving devices associated with an account. Providing a meaningful interface to manage the receiving devices increases customer satisfaction.

SUMMARY

The present disclosure provides a system and method for using a second screen device to view the scheduled recording of events at each receiving device. The system and method also may allow the user to view scheduled recording event conflicts.

In one aspect of the disclosure, a method comprises receiving scheduled recording data from a first receiving device at a second screen device. The scheduled recording data comprises a plurality of scheduled recording events. The method also includes displaying the scheduled recording events on a calendar screen display, determining a conflict between at least two scheduled recording events based on the scheduled recording data and displaying a screen indicator at the second screen device indicative of a conflict.

In another aspect of the disclosure, a method comprises receiving scheduled recording data from a plurality of receiving devices at a second screen device. The scheduled recording data corresponds to a plurality of scheduled recording events. The method further includes displaying the scheduled recording events on a calendar screen display.

In a further aspect of the disclosure, a second screen device comprises a controller and a display. The controller includes a hypertext transfer protocol (HTTP) engine and a calendar display module. The HTTP engine receives scheduled recording data from a first receiving device. The scheduled recording data comprising a plurality of scheduled recording events. The HTTP engine receives conflict data corresponding to a conflict between at least two scheduled recording events based on the scheduled recording data. The calendar display module displays the scheduled recording events on a calendar screen display and displays a screen indicator at the second screen device indicative of a conflict.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
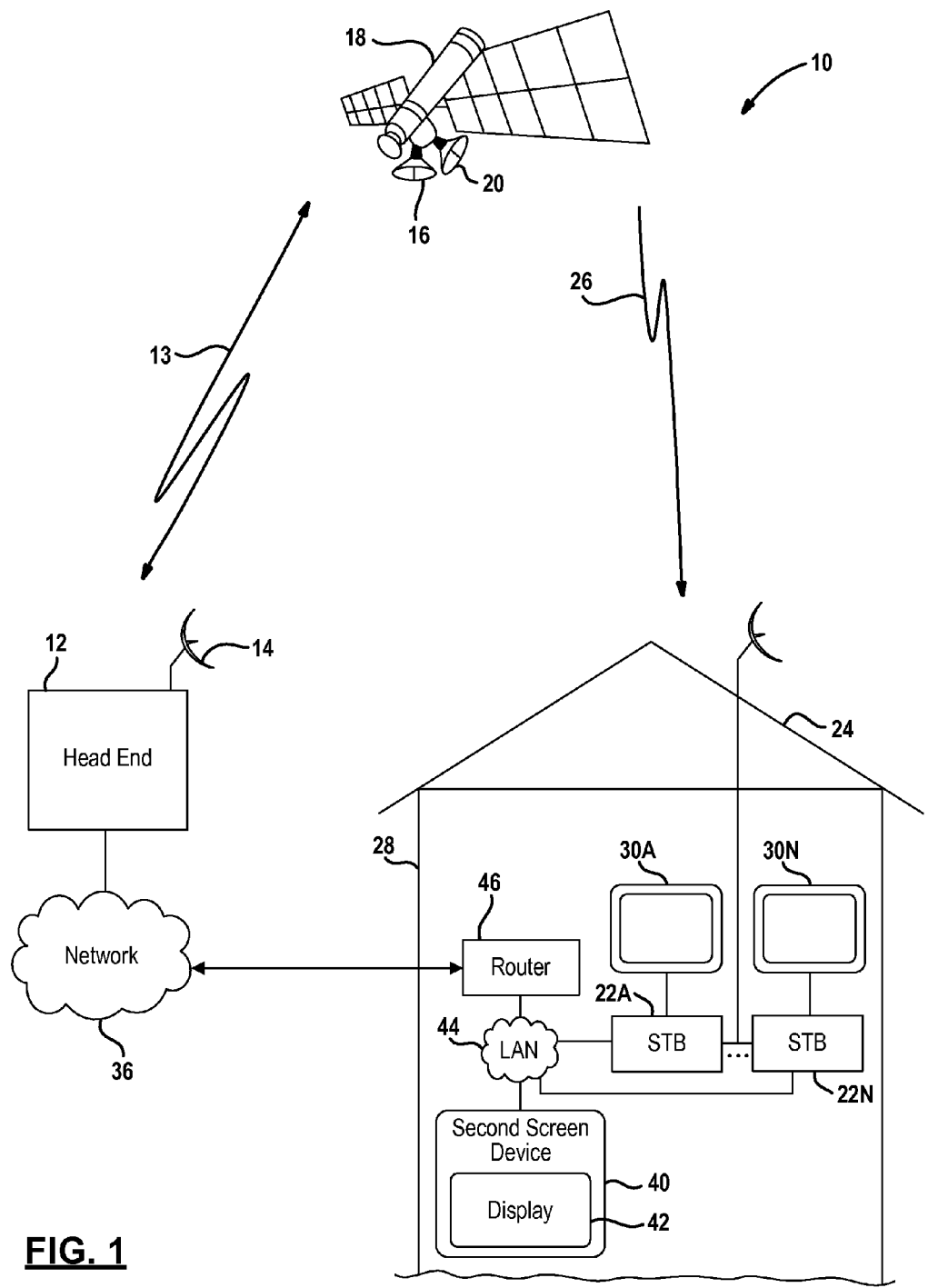
FIG. 1 is a block diagrammatic view of a communication system for content playback and delivery according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. Insert detailed description.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. Set top boxes 22A-22N are example of a stationary receiving system. The set top boxes 22A-22N are in communication with an antenna 24. The antenna 24 receives downlink signals 26 from the transmitting antenna 20 of the satellite 18.

The present example is set forth by way of a building 28. The building may include a plurality of rooms each of which has one or more set top boxes 22A-22N. Each of the set top boxes 22A are associated with a single user account. The building 28 may be a home or commercial building.

The head end 12 may communicate various content, program guide data or other data through the satellite 18. The set top box 22 may receive the content and data.

The set top boxes 22 each have a display 30 associated therewith. The display 30 may be a television or monitor used for displaying video images and providing an audio output. More than one display 30 may also be coupled to a set top box.

A network 36 may be used to connect the head end 12 with various devices included the set top box 22. The network 36 may be one type of network or multiple types of networks. The network 36 may, for example, be a public switched telephone network, the internet, a mobile telephone network, another type of network, or combinations thereof.

The system 10 may also include a second screen device 40. The second screen device 40 may be various types of devices including a mobile phone, a laptop, or a touch screen device or computer. The second screen device 40 may have a screen display 42 used for displaying various types of information as will be set forth further below. The second screen device 40 is referred to as such because it is used together with the display 30 associated with the set top box 22.

A local area network (LAN) 44 may also be incorporated into the building 28. The local area network 44 may be in communication with the set top boxes 22A-22N and the second screen device 40. The local area network 44 may be a wireless or wired local area network.

The local area network 44 may also include a router 46. The router 46 may allow the devices within the local area network 44 to inter-communicate. In this example, the local area network 44 may allow the second screen device 40 and the set top boxes 22A-22N to communicate. The set top boxes 22A-22N may inter-communicate through the local area network 44. The router 46 may also communicate with the network 36. The second screen device 40 is illustrated within the building 28. The second screen device 40 may also be located external to the building 28. The second screen device 40 may communicate through the network 36 which ultimately communicates with the router 46 and the receiving devices 22a-22n through the local area network 44. That is, the second screen device may be coupled to another local area network or through a cellular phone network and to the router 46 using various communication means.

Figure 2:
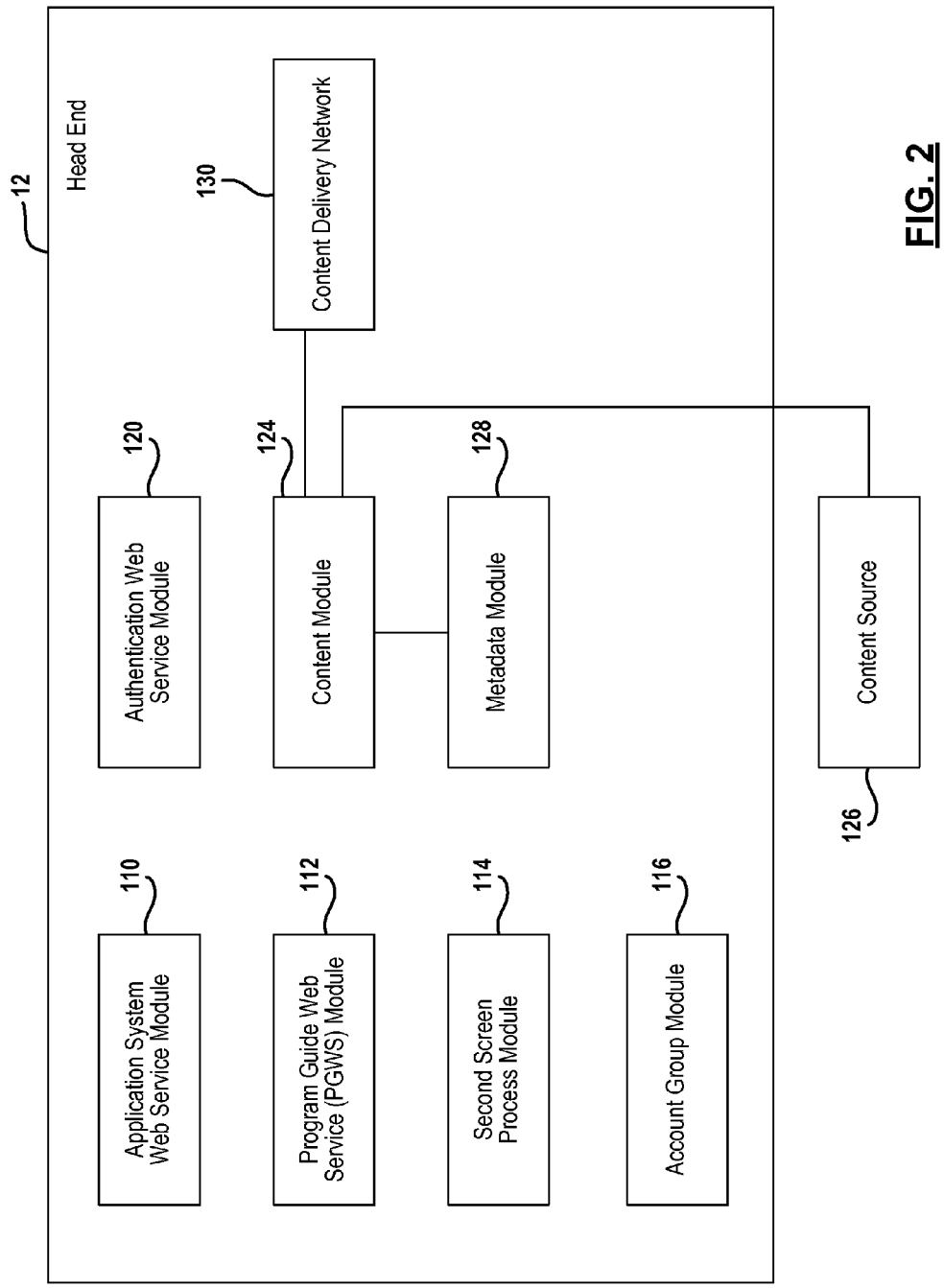
FIG. 2 is a high-level block diagrammatic view of the head end of FIG. 1.

Referring now to FIG. 2, the head end 12 is illustrated in further detail. The head end 12 may include various modules that are interconnected. The interconnections have been eliminated in the figure for simplicity. The head end 12 is illustrated as being within one facility. However, various numbers of facilities with different numbers of modules may be used in an actual implementation.

The head end 12 may include an application system web service module 110. The application system web service module 110 may be a configuration service that provides site definitions, host uniform research locators and application settings. The application system web service module 110 may be used to call other web services such as the program guide web service 112. Interaction of the application system web service 110 will be further described below.

The program guide web service module 112 provides a listing of content to various devices including the set top boxes 22. The program guide web service module 112 may provide details for a grid guide or specific data for a specific channel. The program guide web service module 112 may deliver the program data, channel data, or other forms of data to the second screen device through the network 36 illustrated in FIG. 1.

The head end 12 may include a second screen process module 114 for providing second screen data to second screen devices with the system. The second screen data may include the receiving devices associated with an account.

An account grouping module 116 may also be included within the head end 12. The account grouping module 116 is used to associate groups of receiving devices or set top boxes with a single account. The second screen device 40 is also associated with an account in the account grouping module.

The head end 12 may also include an authentication web service module 120. The authentication web service 120 may act as a look-up service to authenticate a user device such as the set top boxes or the second screen device. The authentication web service module 120 may also be used as a setup service that is used to setup the second screen device based on various user parameters. Such user parameters may include the type of device and the services subscribed to. Some services may be selectively provided to user devices for a fee.

The head end 12 may also include a content module 124. The content module 124 may store content therein. The content module 124 may store movies or sports or other on-demand types of content. The content module 124 may also be used to communicate live content to users from a content source 126. The content source 126 may provide live or linear content. Linear content is content that is broadcasted at a pre-scheduled time according to a pre-determined schedule. Non-linear content, such as on-demand content, is broadcasted upon request and not according to a preset schedule.

A metadata module 128 may also provide data that is broadcasted with the content. The metadata module 128 may also provide data to the program guide web service 112. The metadata module 128 may also include close-captioning, ratings data, or other data that is broadcasted with the content or program guide.

A content delivery network 130 is used to broadcast content to the set top boxes. The content delivery network 130 may broadcast formatted signals such as packetized signals. The formatted signals may be broadcasted through the satellite 18 or may be communicated through the network 36 illustrated in FIG. 1.

Figure 3:
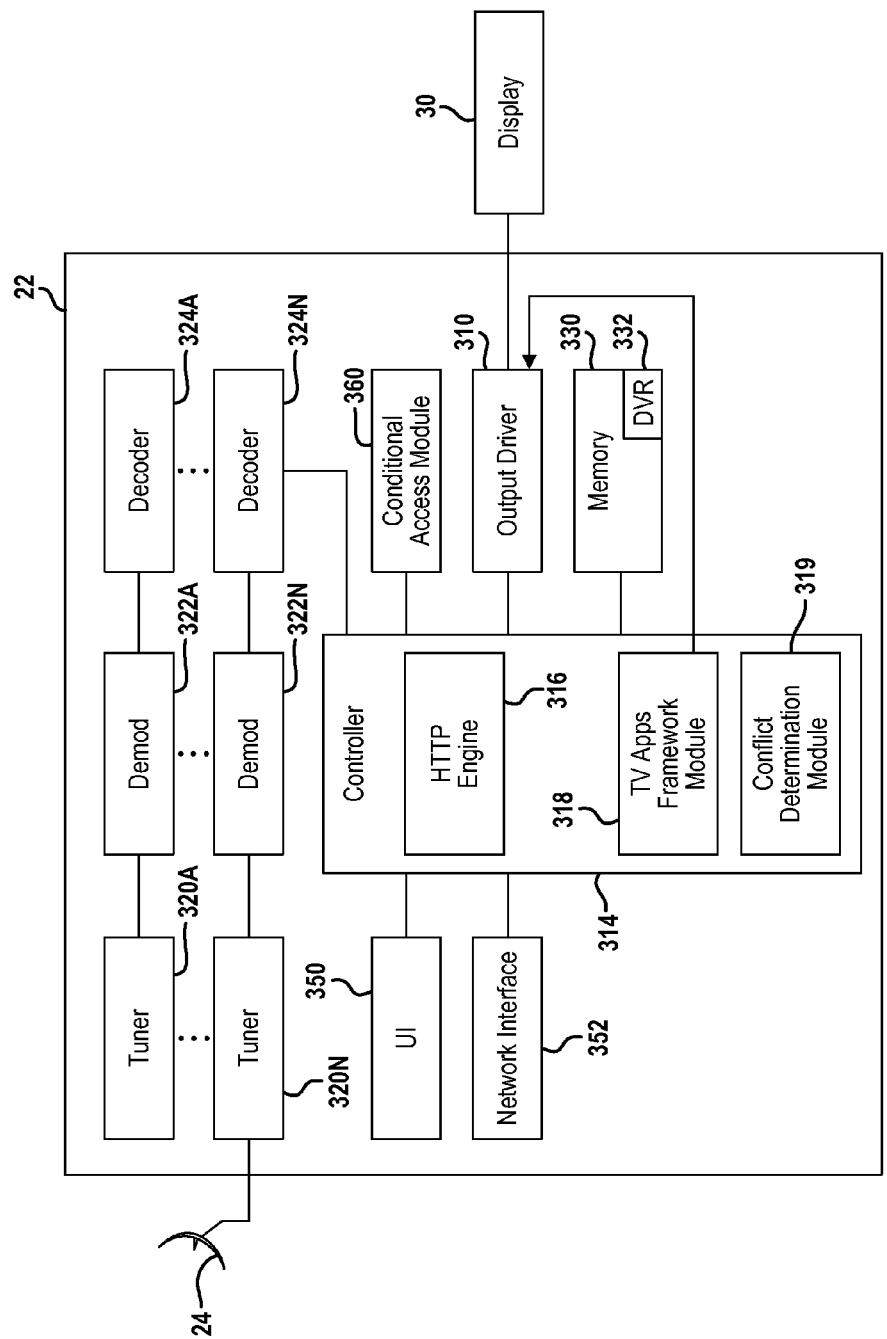
FIG. 3 is a high-level block diagrammatic view of the set top box of FIG. 1.

Referring now to FIG. 3, the receiving device or set top box 22 is illustrated in further detail. Although, a particular configuration of the set top box 22 is illustrated, it is merely representative of various electronic devices with an internal controller used as a content receiving device. The antenna 24 may be one of a number of different types of antennas that may include one or more low noise blocks associated therewith. The antenna 24 may be a single antenna used for satellite television reception. Of course, multiple antennas for different orbital slots may be used. In a cable system no antenna may be used. Rather, a connector to a cable may be used. The set top box 22, as described above, is coupled to a display 30. The display 30 may have an output driver 310 within the set top box 22.

A controller 314 may be a general processor such as a microprocessor that cooperates with control software. The controller 314 may be used to coordinate and control the various functions of the set top box 22. These functions may include tuner 320A-320N, demodulator 322A-322N, decoders 324A-324N such as forward error correction decoders and any buffer or other functions.

The tuners 320 receive the signal or data from the individual channel. The tuners 320 may receive data from a satellite or a terrestrial source such as a cable. The tuners 320 may receive television programming content, program guide data or other types of data. The demodulators 322 demodulate the signal or data to form a demodulated signal or data. The decoders 324 decode the demodulated signal to form decoded data or a decoded signal. The controller 314 may be similar to that found in current DIRECTV® set top boxes which uses a chip-based multifunctional controller. By providing a number of tuners, demodulators and decoders, a number of received content may be used by the receiving device. For example, live viewing and recording may be performed simultaneously. A number of recordings may be made simultaneously depending on the number of tuners available.

The controller 314 may also include a hypertext transfer protocol (HTTP) engine module 316 and a television application framework module 318. The HTTP engine module 316 (HTTP engine) is used to receive commands through the local area network 44. The commands in this example are received from the second screen device 40. The HTTP engine module 316 receives the commands that are acted upon by the controller 314. The HTTP signals received at the HTTP engine 316 may be scheduled recording requests and conflict data requests. Control signals selecting alternative times and receivers for resolving conflicts may also be received. The various content signals will be described below.

The television (TV) application framework module 318 is used for launching various applications such as a widget that is viewable on the television. The widgets may be displayed on top of the video on the display 30. The TV application framework module 318 may request data for user accounts, program information, sports data, or the like from the data services center 50. The TV application framework module 318 may receive the requested data and display the data in a particular format or position on the display 30.

The controller 314 may also include a conflict determination module 319. The conflict determination module 319 may determine whether conflicts exist for scheduled recording events by reviewing the scheduled recording data (stored in memory 330 as described below). That is, by reviewing the scheduled recording data, the time slots and the available resources, such as tuners, are compared. If more recordings are scheduled than the number of tuners, then a conflict exists Likewise, if live TV is being watched and one tuner is reserved for such purposes, the number of tuners available for recording is also reduced. As will be further described below, conflict data may be provided to a second screen device so that conflicts may be easily viewed by the user. The data from the conflict determination module 312 is used by the second screen device to display an indicator indicative of a conflict so that it may be easily viewed and resolved.

The conflict determination module 319 may also be used to determine alternate times or to determine alternate receiving devices available for recording. The conflict resolution data may also be stored in the memory 330. The combined resolution data may be communicated to the second screen device with the conflict data or as a separate group of data.

The controller 314 is in communication with a memory 330. The memory 330 is illustrated as a single box. The memory 330 may actually be a plurality of different types of memory including the hard drive, a flash drive and various other types of memory. The memory 330 may be other types of memory or sections of different types of memory. The memory 330 may be non-volatile memory or volatile memory.

The memory 330 may include storage for various operational data collected during operation of the set top box 22. For example, scheduled recording data corresponding to scheduled recording events may be stored. Conflict data and conflict resolution data may also be stored. The memory 330 may store various types of data including set top box playlist data that has the playlist for content saved within the memory 330. Another type of data stored in the memory is the favorite settings for the set top box 22. Another type of data in the memory 330 may include the channels subscription data, the blocked channels, adult channels, rating limits set by the set top box 22, current set top box language, prioritizer data, TV resolution data, to do list data, the conditional access module identifier, time zone data, time of day daylight savings, status data, aspect ratio data, viewing hours data, quick tune list and a zip code.

The memory 330 may also store the advanced program guide data. The memory 330 may store program guide data that is received at the head end. The program guide data may include amounts of data including two or more weeks' worth of program guide data. The program guide data may be used to determine alternate program times by the conflict determination module. The program guide data may be communicated to the set top box 22 in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier, producer data and event type. The data may also include various other settings.

The memory 330 may also include a digital video recorder 332. The digital video recorder 332 may be a hard drive, flash drive, or other memory device. A record of the content stored in the digital video recorder is a playlist. The playlist may be stored in the DVR 332 or other parts of memory 330.

The set top box 22 may also include a user interface 350. The user interface 350 may be various types of user interfaces such as a keyboard, push buttons, a touch screen, a voice activated interface or the like. The user interface 350 may be used to select a channel, select various information, change the volume, change the display appearance, or other functions. The user interface 350 may also be used for selecting recommendation and providing feedback for recommendations as will be described below.

A network interface 352 may be included within the set top box 22 to communicate various data through the networks 36/44 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The set top box 22 may also include a conditional access module 360. The conditional access module 360 prevents unauthorized reception of the television signals through the antenna 24. The conditional access module 360 may use a cryptographic hash to authorize the use and display of the received signals.

Figure 4:
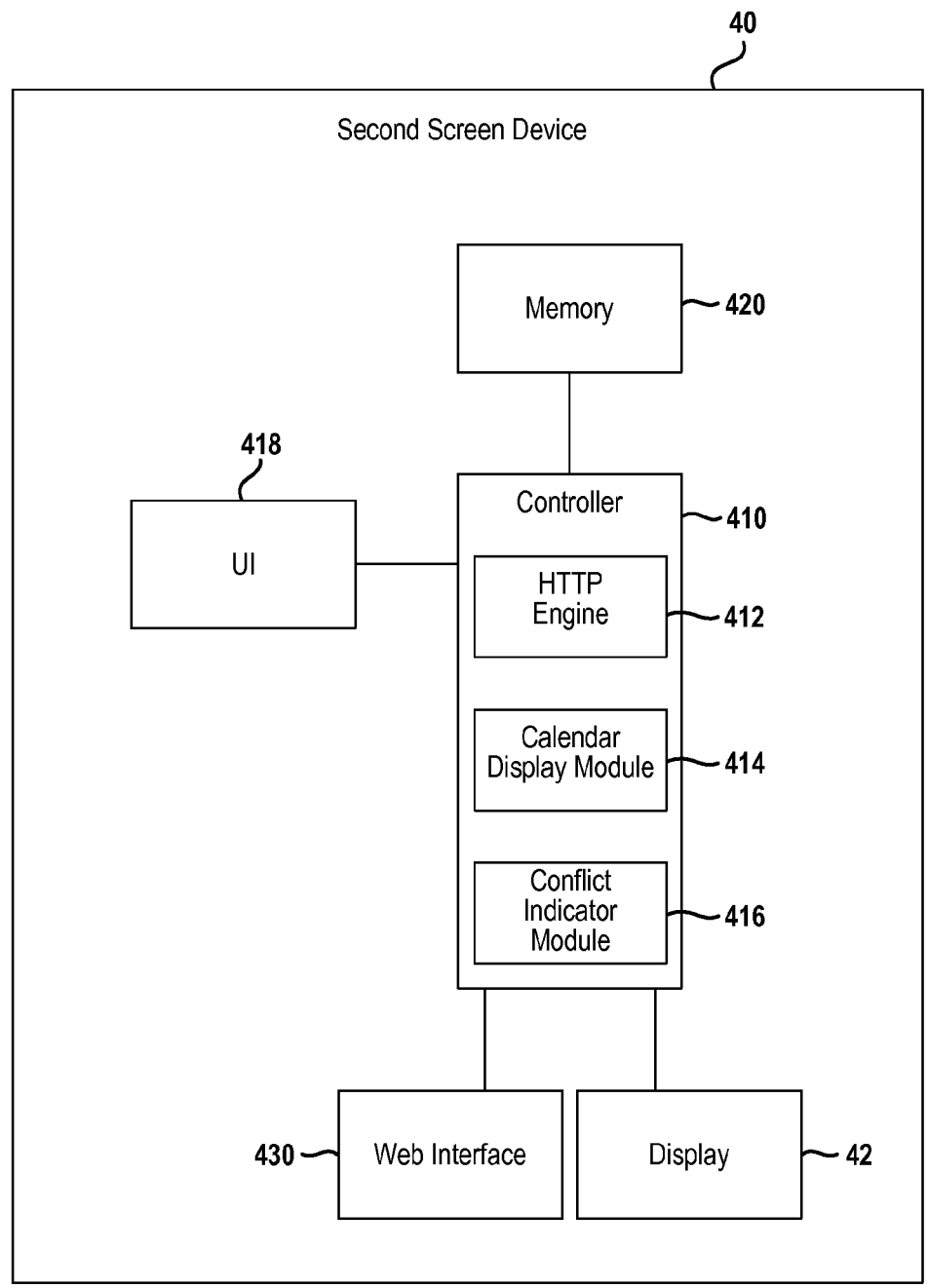
FIG. 4 is a high-level block diagrammatic view of a second screen device of FIG. 1.

Referring now to FIG. 4, a block diagrammatic view of the second screen device 40 illustrated in FIG. 1 is set forth. As mentioned above, the second screen device 40 is a user device that includes a display or screen. The second screen device 40 may be a tablet computer, a laptop computer, a mobile phone, or the like. One example of such a device is an iPad® by Apple Corp. The second screen device 40 includes a controller 410. The controller 410 may include a central processing unit that is microprocessor-based. The controller 410 performs various functions including controlling a screen display 42. The controller 410 may include an HTTP engine 412. The HTTP engine 412 formats signal using HTTP protocol for communication through the networks 36/44. Requesting scheduled recording data, conflict data or the receiving devices are examples of commands that may use the HTTP format.

A calendar display module 414 may also be included within the controller 410. The calendar display module 414 generates a calendar display having a day, time slots and other time-indicative data. The calendar display module 414 receives the scheduled recording data from one or more receiving devices associated with a user account. The scheduled recording events are displayed on the appropriate segments of the calendar display by the calendar display module 414.

A conflict indicator module 416 receives conflict data from the user devices associated with the set top boxes. When conflicts exist corresponding to too many resources being used for recording or live TV watching, the conflict indicator module 416 generates a conflict indicator. The conflict indicator may be manifested in many ways including highlighting the conflicting scheduled recording events. Highlighting conflicting recording events may correspond to changing the color of the font, underlining the conflicts or placing a box around the conflicts. In addition, an indicator may be placed next to a recording event title that illustrates the conflict. For example, a red dot or exclamation point may be placed next to the conflicting scheduled recording events. Of course, other types of indicators that convey a conflict to the user of the second screen device may be used.

The controller 410 is also in communication with a user interface 418. The user interface 418 may be one or a combination of different types of user interfaces depending upon the device. Many tablet computers include pushbuttons or touch screens or both. Keyboards, styluses and other types of input devices may also be used as a user interface 418 of the second-screen device. The user interface 418 is used to provide various inputs and responses to elements displayed on the screen display 42. When the user interface is a touch screen or touch display, the screen display 42 and the user interface 418 may be one in the same. More than one user interface 418 may be incorporated into the second screen device 40.

A memory 420 is also in communication with the controller 410. The memory 420 may include different types of memory that store different types of data. The memory 420 may store operating software for the device, operating data, user settings, video, music, documents, and applications. The applications may perform various functions, including an application for communicating with the receiving device 22 illustrated in FIGS. 1 and 3 and obtaining data from the set top box and data services center. A web interface 430 may be used for communicating with the head end 12 and the receiving device box 22. The web interface 430 may allow a connection to the network 36 and network 44. The web interface 430 may allow communication through a wireless network such as a local area network, a wide area network or a mobile or cellular network.

In the present example, the controller 410 allows the user to customize the screen display 42 to display various types of data in a user-controlled format. That is, the screen display 42 may be customized to display the data desired by the user. The second screen device 40 may display additional information about scheduled programming events for the receiving devices in the system and programming conflicts at the receiving devices. The controller through input from the screen display 42 may also display programming shown through the set top box 22 and provide means for controlling the set top box(es) or receiving device(s). The data is received through the web interface 430.

Figure 5:
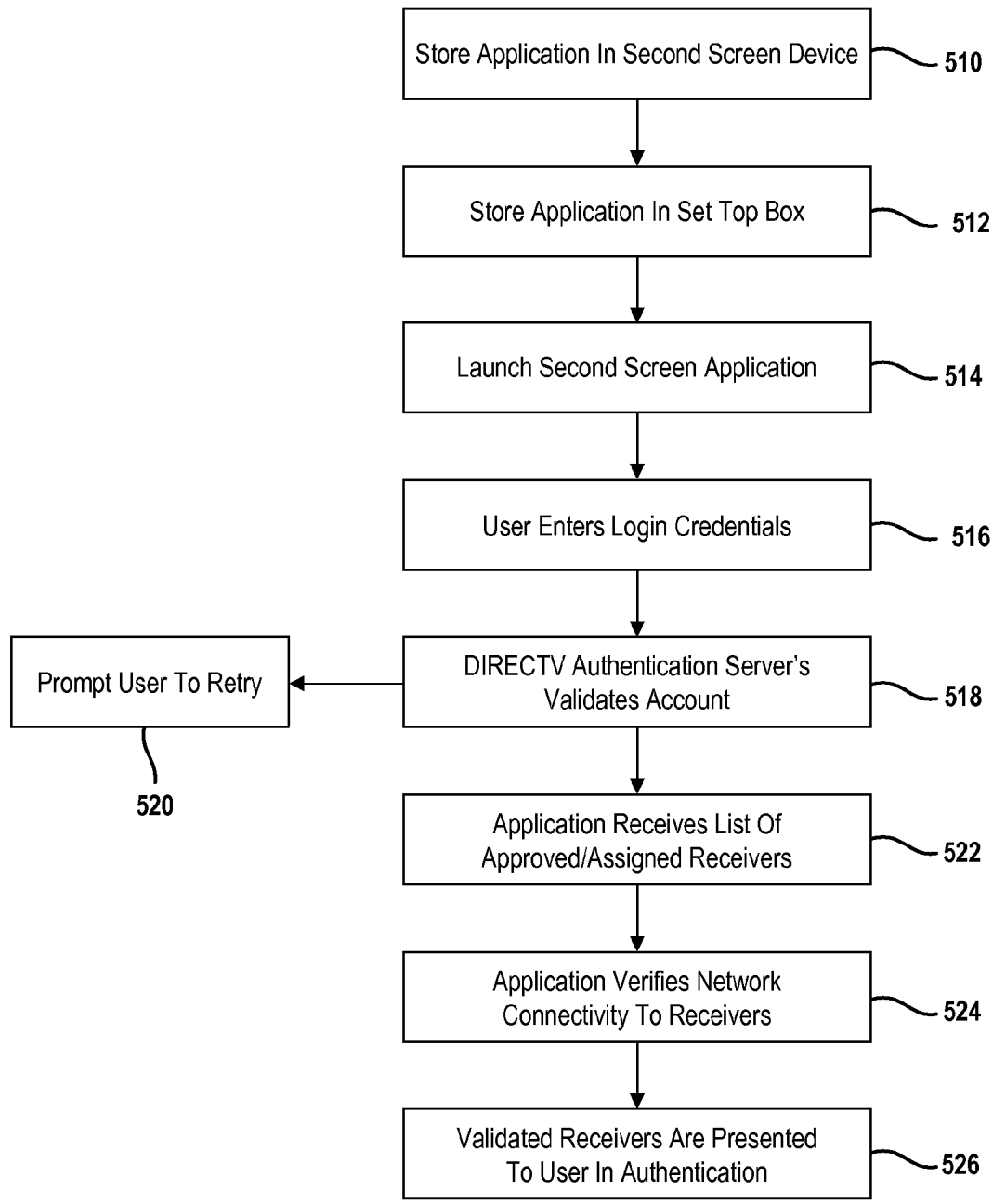
FIG. 5 is a flowchart of a method for associating receivers or set top boxes to an account and performing authentication thereof.

Referring now to FIG. 5, a method for using the second screen device 40 to perform actions such as viewing scheduled recording events and resolving conflicts is set forth. In step 510, an application is stored in a memory of the second screen device 40. An application is a program that interacts with the user interface and the controller to perform a function. In this example, the second screen device 40 and the set top box or receiving device 22 interact to receive and transmit specific content data using the application such as scheduled recording data, conflict data and conflict resolution data. Of course, other data and commands may be exchanged.

In step 512, an application is stored in the set top box. The application in the set top box, in this example, allows the set top box to communicate with the second screen device and provide data thereto. For example, status data such as the power status (on/off), the program currently playing, the next program scheduled to play, scheduled recordings, and the like. The data may also be data about or related to video content. Also, the application within the set top box controls the display associated with the set top box to display various data associated with the application.

In step 514, the second screen application is launched at the second screen device. In step 514, the login state or screen for the user is presented to the second screen device. The user of the second screen device is prompted for security details such as a user identifier, password or the like. In step 518, the authorization web service retrieves the stored user information and compares that to the entered security information. If authorization is not successfully performed in step 518, the user may be prompted for further details or another attempt in step 520.

In step 518, when the account is validated, the account grouping module 116 generates a list of approved or assigned receivers for the particular account in step 522. In step 524, the application verifies network connectivity to each of the receivers in the list of approved or assigned receivers. In step 526, the receivers are presented to the users in the application that have connectivity and that are on the approved list.

Figure 6:
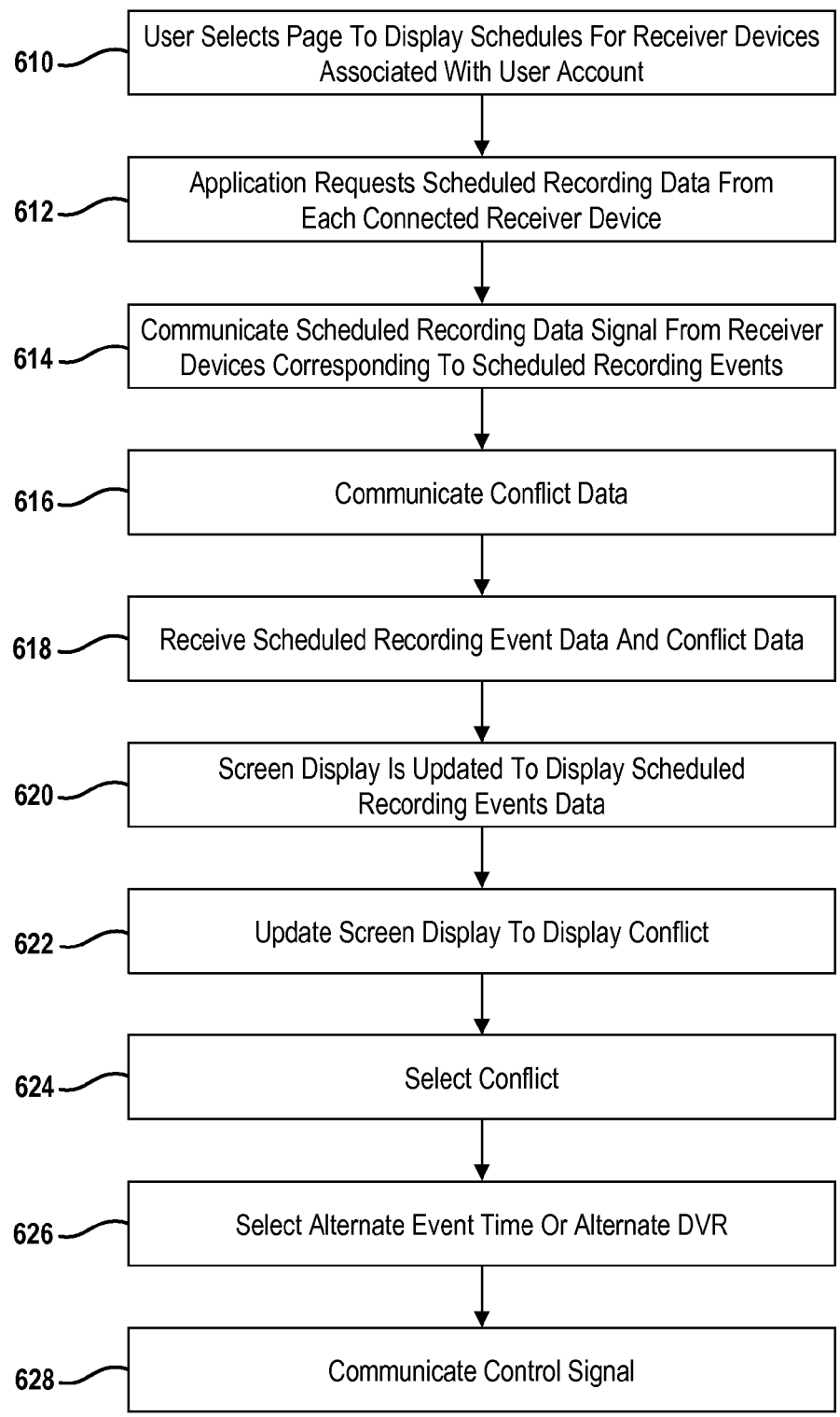
FIG. 6 is a flowchart of a method of displaying scheduled recording events and resolving conflicts.

Referring now to FIG. 6, the present disclosure may be part of an overall application for controlling various functions of the second screen device. Therefore, the user must select a page to display schedules for receiver devices associated with the user account. In step 612, the application may request scheduled recording data from each connected receiver device. Of course, all of the data may be requested from all of the receiver devices or limited portions of data may be requested. For example, data for only one receiver device may be selected or data for all of the receiver devices may be selected.

In step 614, the scheduled recording data is communicated from each of the receiver devices that corresponds to the scheduled recording events. The communication may take place using an HTTP signal. In step 616, each of the receiver devices may also communicate conflict data to the second screen device. Each of the receiving devices generates conflict data for conflicts between recording events. A conflict corresponds to an event or events that may not be fulfilled based upon the lack of resources. The second screen device receives the conflict data and the scheduled recording data. The conflict data may also include conflict resolution data such as alternate dates and alternate receiving devices that may be used for fulfilling the conflicting recording request.

In step 620, the calendar display module of FIG. 4 is used to display scheduled recording events on the screen display. The scheduled recording events may be displayed in the timeslots corresponding to the event timeslots. One or more scheduled recordings may take place within a timeslot due to the number of resources available such as tuners. Further, some screen displays may display all of the scheduled recordings from all of the receiving devices associated with an account. The screen displays may show monthly, weekly, or daily calendar views with associated recording events.

In step 622, the conflict indicator module 416 may generate indicators to show a conflict between various recording events. As mentioned above, the conflict indicator module may display conflicts in various manners, including changing the color, outlines, or providing a separate indicator.

In step 624, a conflict may be selected from the screen display. A conflict box, as will be illustrated later, may be displayed for providing alternatives to the conflict. In step 626, an alternative to the conflict event time or alternate receiving device may be selected. In response to selecting an alternative event time or alternate receiving device, a control signal may be communicated to the affected digital video recorders or receiving devices in step 628.

Figure 7:
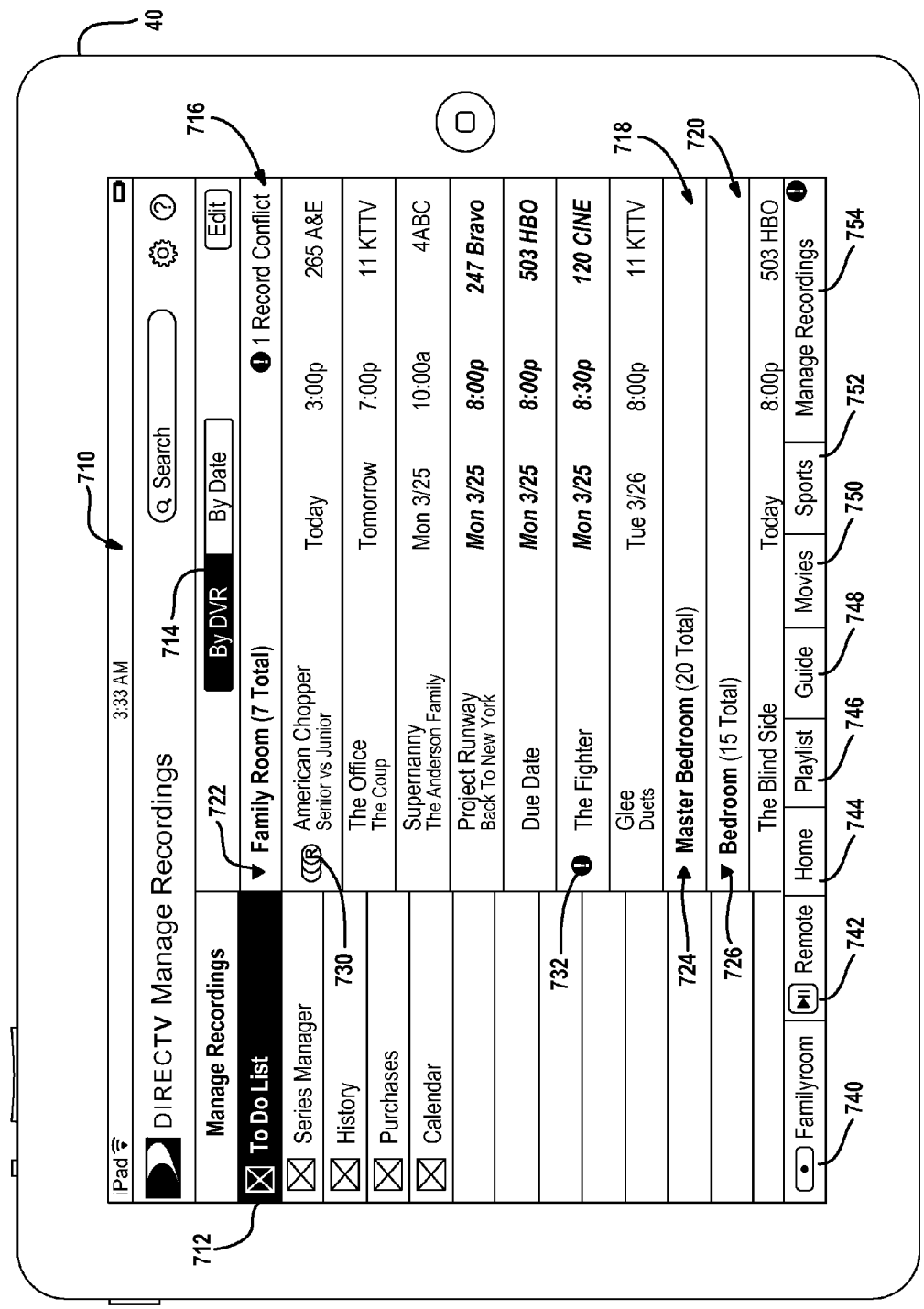
FIG. 7 is a screen display for displaying scheduled recording events and conflicts.

Referring now to FIG. 7, a screen display 710 displayed on the second screen device 40 is illustrated. In this example, a "to do list" selection 712 has been selected. In this manner, the selection 712 is illustrated darkened with white letters as opposed to the non-selected items which appear in black letters surrounded by white. In an actual screen display, various colors may be used to form a selection indicator. In this example, a "by DVR" selector 714 has been selected. The recording events corresponding to the recording event data is displayed by the DVR title. In this example, a family room selector 716, a master bedroom selector 718 and a bedroom selector 720 are all illustrated. A respective selector arrow 722, 724 and 726 are used for expanding or contracting the respective data for the selectors 716-720. Arrow 722 has been selected (as indicated by a downward pointing arrow) and thus a plurality of lines containing the scheduled recording event title, the date, the time, the channel, and a channel identifier for the scheduled recording selections are all displayed. The first line corresponds to "American Chopper" which has a series indicator 730 thereby which indicates the entire series is to be recorded. In this example, a conflict between three events "Project Runway," "Due Date" and "The Fighter" is illustrated. A conflict indicator 732 is provided next to "The Fighter" to indicate that "The Fighter" will not be recorded due to a conflict with "Project Runway" and "Due Date." As is illustrated, the day, date, time, channel number and channel identifier are all bolded. However, in an actual implementation various colors may be used to indicate conflicting content as opposed to now-conflicting content. In this case, eliminating one of the conflicting content lines will resolve the conflict. If no conflict is resolved, the last conflict in the list may not be recorded.

The indicator 724 indicates a right word pointing arrow and the words "20 total" are illustrated next to the words "Master Bedroom." By selecting the arrow 724, a downward pointing arrow similar to the symbol 722 may be displayed and each of the lines corresponding to the "Master Bedroom" digital video recorder may be displayed on the screen display. When too many titles are associated with a particular room or too many arrow symbols are selected, the lines may be scrolled.

The screen display 710 may also be used to control the various digital video recorders. At the bottom of the screen display, an indicator 740 indicates the family room digital video recorder has been selected. A pause and play button 742 may be used to pause and play the current recording associated with the digital video recorder. A home key 744, a playlist key 746, a guide key 748, a movies key 750, a sports key 752, and a manage recording key 754 may also be displayed. Each of the keys may display various items such as the playlist, the program guide, various movies, sporting events, or provide the capability to manage recordings. Of course, other functions may be made available.

Figure 8:
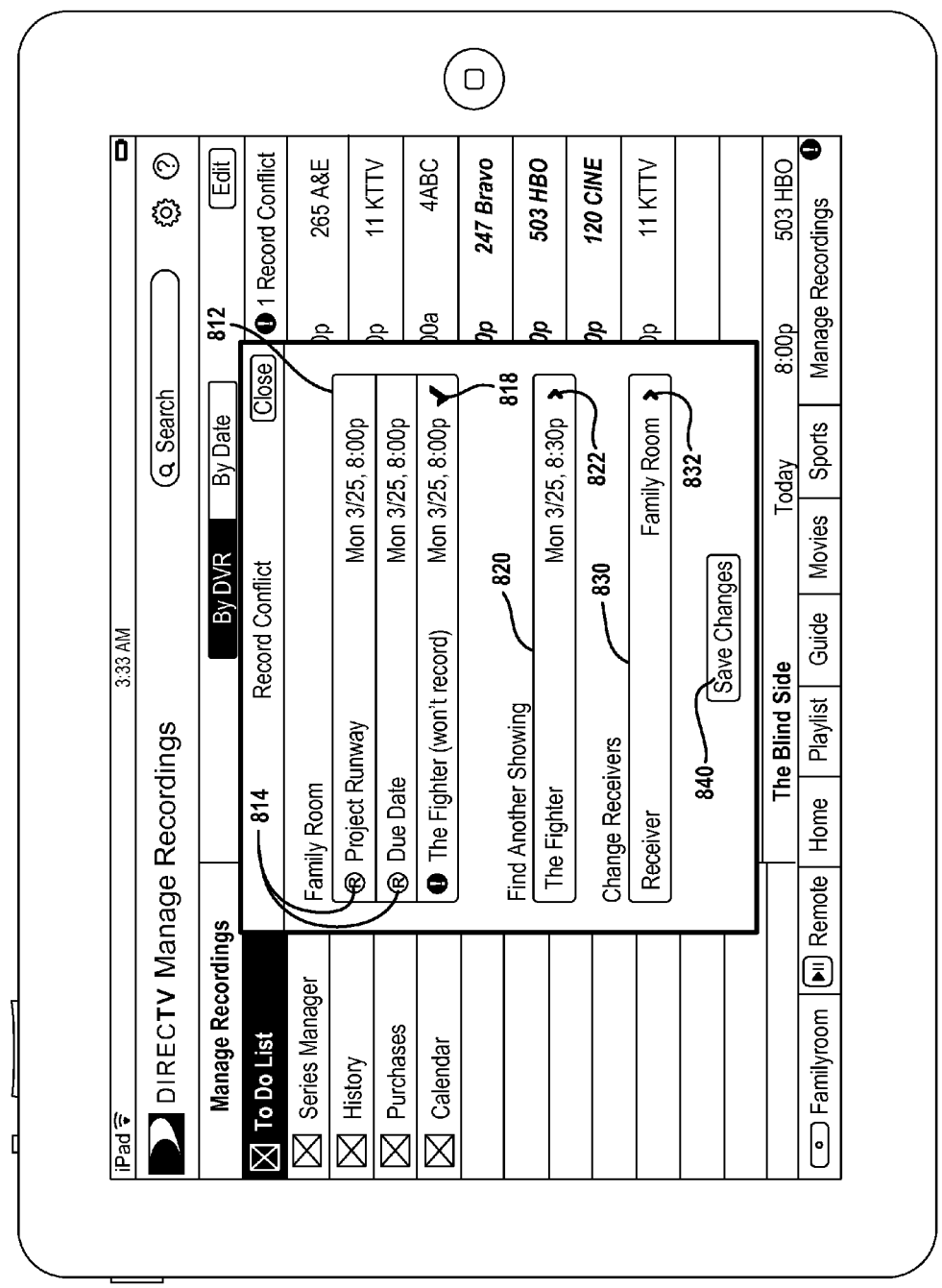
FIG. 8 is a screen display illustrating a conflict recording box for resolving conflicts of scheduled recording events.

Referring now to FIG. 8, a recording conflict resolution box 810 is illustrated over the previous screen illustrated in FIG. 7. By selecting the manage recordings key 744, the conflict resolution box 810 illustrates the conflict in the family room box by displaying the titles in box 812. The titles "Project Runway" and "Due Date" have a record indicator 814 to indicate that these titles will record. The indicator 816 is a conflict indicator to indicate that "The Fighter" will not record. By selecting "The Fighter" the checkmark 818 is displayed and another showing may be displayed in the "Find Another Showing" box 820. By selecting the arrow 822, another showing of the identical scheduled recording event may be displayed, if available.

Another alternative to finding another showing of a scheduled recording event is changing receivers. A "Change Receivers" box 830 currently indicates the "family room" DVR is selected. By selecting the arrow indicator 832, a list of alternative digital video recorders may be displayed for selecting an alternative resource for performing the recording.

As is illustrated, the recording conflict resolution box 810 may provide alternatives for the conflicted event. Another showing time or changing receiving devices may be provided. Once the desired changes are performed and the conflict has been removed, the "save changes" box 840 may be selected. A control signal such as a conflicts resolution signal may then be generated at the second screen device and is communicated to the receiving devices affected. For example, if an alternate receiving device is selected, the family room receiving device may be unselected to record "The Fighter" and the master bedroom receiving device may be selected to perform the recording. Therefore, control signals may be provided to both the family room and master bedroom digital video recorders. One control signal corresponds to cancelling a recording (cancel control signal) and one corresponds to enabling the recording on the alternative recording device (enable recording control signal). Should an alternative time be selected, an alternative time control signal may be communicated to the family room digital video recorder to change the recording time to the new recording time.

Figure 9:
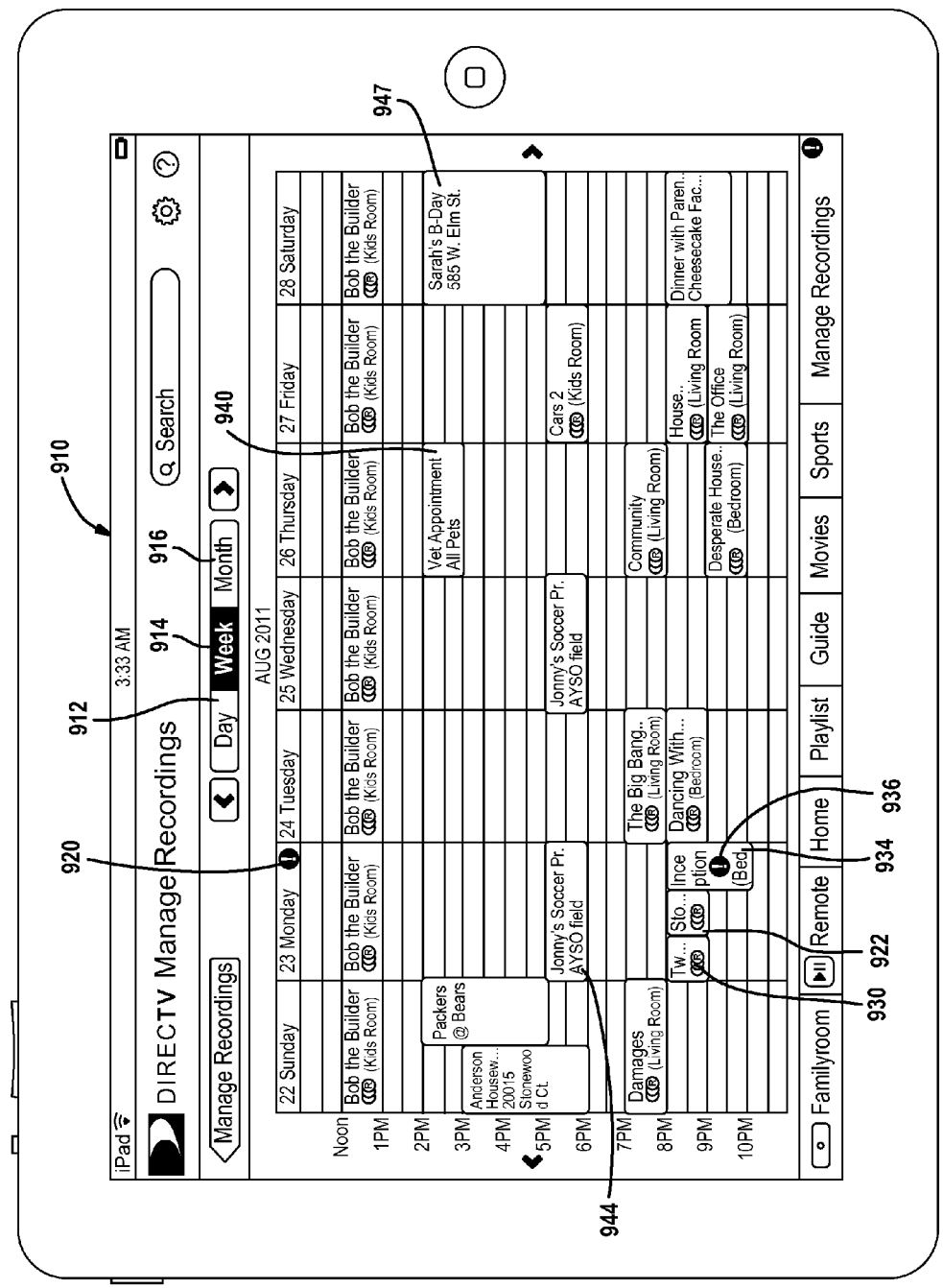
FIG. 9 is a screen display of a calendar view for managing recordings.

Referring now to FIG. 9, a screen display 910 associated with the application illustrating a week view is set forth. As is illustrated, a day selector 912, a week selector 914, and a month selector 916 may all be selected to display a respective daily view, weekly view or monthly view. In this example, the week selector 914 is illustrated corresponding to one week in the month of August. All of the scheduled recording events are illustrated. A conflict indicator 920 illustrates a conflict within a particular time period such as a day. In this example, Monday, August $23^{rd}$, has a conflict at 8:00 p.m. A first recording program event 930, a second recording program event 932 and a third recording program event 934 are all illustrated in timeslots corresponding to the recording events. The third recording program event 934 also includes conflict indicator 736. Other types of indicators such as a colored outline, or the like, may also be provided.

Besides recording events, other calendared type of events may also be displayed. Personal appointments such as veterinary appointments illustrated in box 940, birthday appointments in box 942 and soccer practice in box 944 may all be displayed on the calendar display. In an implementation of the present disclosure, these personal appointments may be displayed in an alternative color, font or other characteristics from the recordings to be managed.

Figure 10:
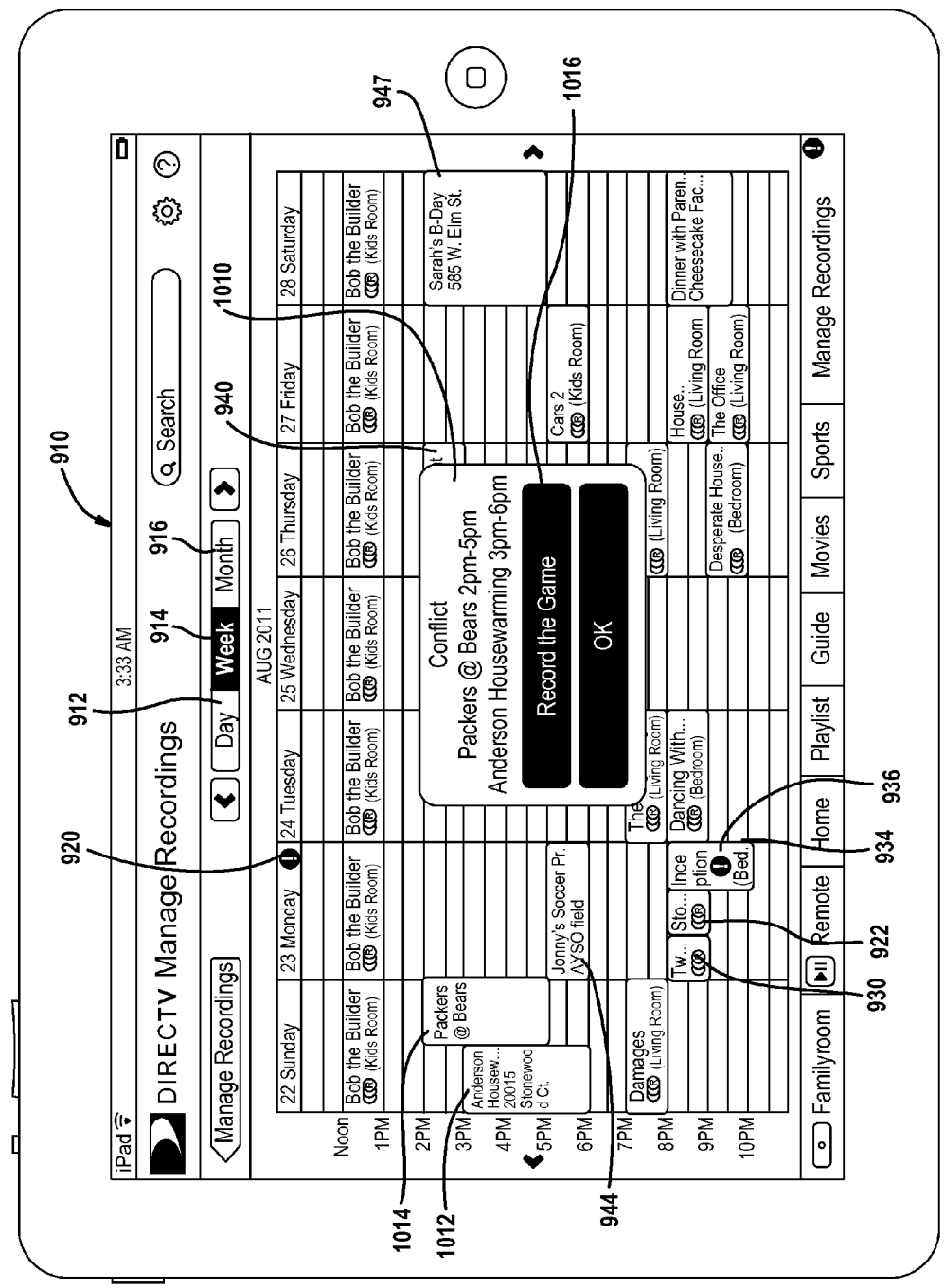
FIG. 10 is a screen display illustrating conflicts within a calendar view.

Referring now to FIG. 10, a conflict box 1010 may be displayed over the screen display. In this example, a personal conflict item 1012 and a recording are in conflict. In this example, a "record the game" box 1016 may be selected to record the game and indicate that the user of the second screen device is aware of the conflict.

Figure 11:
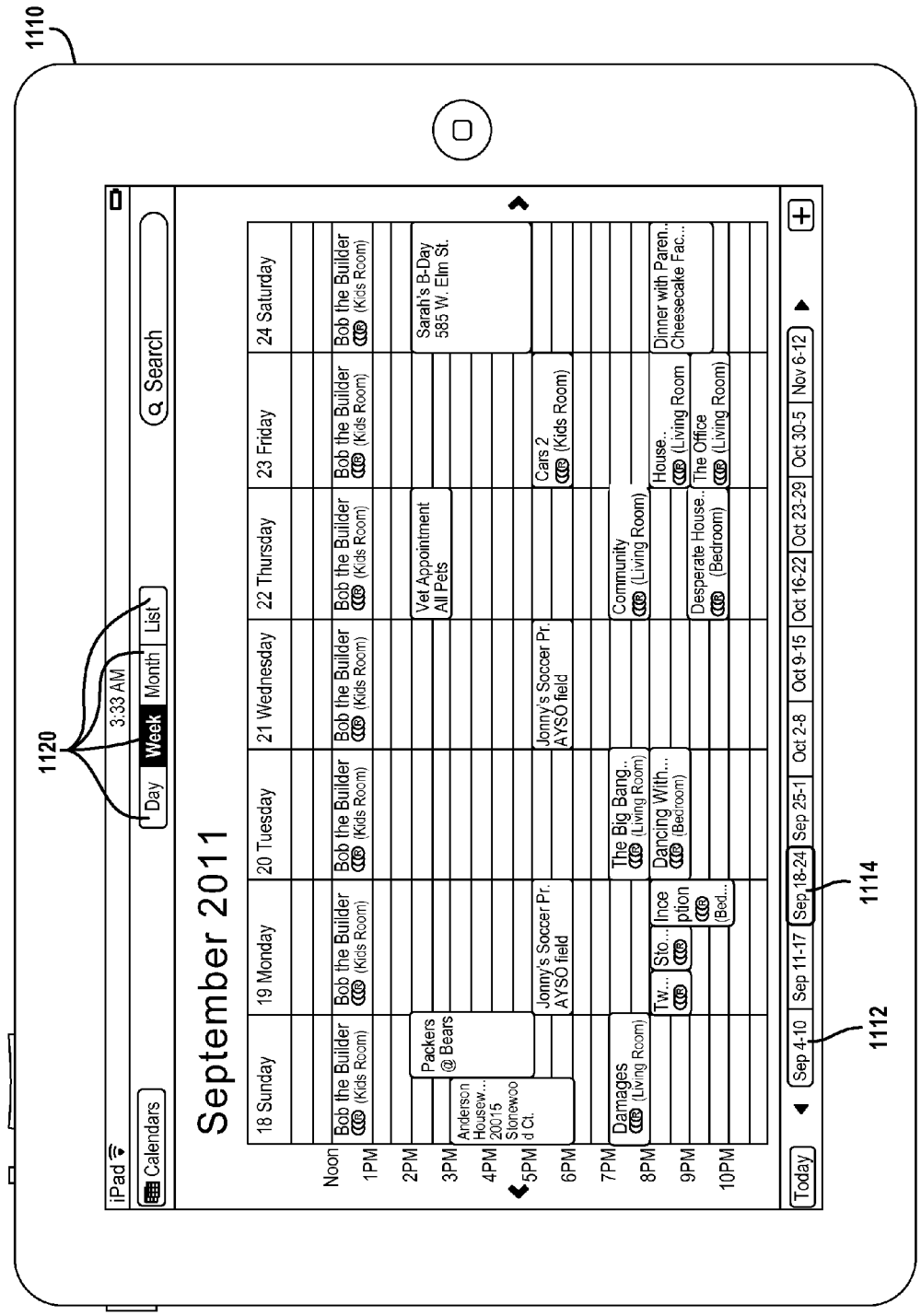
FIG. 11 is a screen display of a calendar view for the second screen device outside of the application.

Referring now to FIG. 11, a screen display 1110 is illustrated that corresponds to the calendar function of the second screen device. In this figure, personal events and recordings may be displayed for a time period on the calendar function of the second screen device. The screen display 1110 may thus be outside of the application corresponding to the control of the receiving devices. Week selectors 1112 may be displayed along the bottom of the screen display 1110. By selecting a week, the conflicts for the particular week may be illustrated. In this example, an indicator 1114 illustrates the week selected to be displayed. Selectors 1120 at the top of the screen display 1110 illustrate a day listing, a week listing, a month listing and an entire listing may be set forth for selection.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   wirelessly requesting, at a second screen device, scheduled recording data from a set top box;
   receiving, at the second screen device, scheduled recording data from the set top box at the second screen device, said scheduled recording data comprising a plurality of scheduled recording events;
   displaying the scheduled recording events on a calendar screen display that simultaneously displays at least three consecutive days, each day having a plurality of timeslots, said scheduled recording events displayed in multiple timeslots for the at least three days;
   determining conflicting scheduled recording events between at least two scheduled recording events based on the scheduled recording data;
   displaying a screen indicator at the second screen device indicative of the conflict by displaying at least one of changing a color of a font of the conflicting scheduled recording events, underlining the conflicting scheduled recording events, placing a box around the conflicting scheduled recording events, and placing an indicator next to the conflicting scheduled recording events; and
   selecting the screen indicator to initiate removing the conflict.

2. The method as recited in claim 1 wherein receiving scheduled recording data from the first set top box at the second screen device comprises receiving scheduled recording data from the first set top box and a second set top box at the second screen device, and wherein displaying the scheduled recording events on the calendar screen display comprises displaying the scheduled recording events associated with the first-set top box and the second set top box on the calendar screen display.

3. The method as recited in claim 1 wherein displaying the scheduled recording events comprises displaying the scheduled recording events on a weekly view or a monthly view.

4. The method as recited in claim 1 wherein displaying the scheduled recording events on the calendar screen display comprises displaying the recording events and personal events on the calendar screen display.

5. The method as recited in claim 1 wherein displaying the screen indicator comprises displaying the screen indicator in a different color than non-conflict events.

6. The method as recited in claim 1 wherein displaying the screen indicator comprises displaying a conflict indicator adjacent to at least one recording event.

7. The method as recited in claim 1 further comprising displaying a conflict resolution box displaying a selection for resolving the conflict.

8. The method as recited in claim 7 further comprising selecting the selection and communicating a conflict resolution signal to the first set top box.

9. The method as recited in claim 7 wherein selecting the selection comprises selecting an alternative set top box.

10. The method as recited in claim 7 wherein selecting the selection comprises selecting an alternate time.

11. A second screen device comprising:
a display; and
a controller comprising a hypertext transfer protocol (HTTP) engine and a calendar display module, said controller requesting schedule data from a first set top box and conflict data, said HTTP engine receiving scheduled recording data from the set top box, said scheduled recording data comprising a plurality of scheduled recording events, said HTTP engine receiving conflict data corresponding to a conflict between at least two scheduled recording events based on the scheduled recording data;
said calendar display module displaying the scheduled recording events on a calendar screen display that simultaneously displays at least three consecutive days, each day having a plurality of timeslots, said scheduled recording events displayed in multiple timeslots for the at least three days and displaying a screen indicator at the second screen device indicative of the conflict by displaying at least one of changing a color of a font of the conflicting scheduled recording events, underlining the conflicting scheduled recording events, placing a box around the conflicting scheduled recording events, and placing an indicator next to the conflicting scheduled recording events.

12. The second screen device as recited in claim 11 wherein the calendar display module displays the scheduled recording event on a weekly view or a monthly view.

13. The second screen device as recited in claim 11 wherein the calendar display module displays the scheduled recording events and personal events on the calendar screen display.

14. The second screen device as recited in claim 11 wherein the calendar display module displays the screen indicator in a different color than non-conflict events.

15. The second screen device as recited in claim 11 wherein the calendar display module displays a conflict indicator adjacent to at least one recording event.

16. A system comprising:
the second screen display as recited in claim 11;
the first set top box.

17. The system as recited in claim 16 wherein a conflict indicator module displays a conflict resolution box displaying a selection for resolving the conflict.

18. The system as recited in claim 16 wherein the controller communicates a conflict resolution signal to the first set top box in response to selecting the selection.

19. The system as recited in claim 18 wherein the conflict resolution signal corresponds to an alternative set top box.

20. The system as recited in claim 18 wherein the conflict resolution signal corresponds to an alternate time.

21. The system as recited in claim 16 further comprising a second set top box and wherein the calendar display module displays the scheduled recording events associated with the first set top box and the second set top box on the calendar screen display.

22. The system as recited in claim 16 wherein the second screen device comprises a mobile touch screen device.

\* \* \* \* \*